United States Patent [19]
Swartz

[11] Patent Number: 5,453,600
[45] Date of Patent: * Sep. 26, 1995

[54] MACHINE READABLE CODE COMBINING PREPRINTED INDICIA WITH HAND-MARK DATA

[75] Inventor: Jerome Swartz, Old Field, N.Y.

[73] Assignee: Symbol Technologies, Inc., Bohemia, N.Y.

[*] Notice: The portion of the term of this patent subsequent to Jul. 19, 2011 has been disclaimed.

[21] Appl. No.: 224,931

[22] Filed: Apr. 8, 1994

Related U.S. Application Data

[63] Continuation of Ser. No. 913,092, Jul. 14, 1992, Pat. No. 5,331,137.

[51] Int. Cl.⁶ .............................. G06K 7/10; G06K 5/00; G09B 3/06; G09B 7/06
[52] U.S. Cl. .................. 235/375; 235/462; 235/437; 235/495; 434/326; 434/358; 434/363; 434/364
[58] Field of Search .................... 235/375, 385, 235/462, 437, 487, 495; 434/326, 353, 355, 358, 363, 364; 33/562

[56] References Cited

U.S. PATENT DOCUMENTS

| | | | |
|---|---|---|---|
| 1,883,775 | 10/1932 | Finkenbinder | 434/326 |
| 3,089,260 | 5/1963 | Gray | 434/364 |
| 3,408,482 | 10/1968 | Busby | 434/355 |
| 4,728,784 | 3/1988 | Stewart | 235/462 |
| 4,877,948 | 10/1989 | Krueger . | |
| 4,978,305 | 12/1990 | Kraft | 434/358 |
| 5,102,341 | 4/1992 | Koslin . | |
| 5,331,137 | 7/1994 | Swartz | 235/375 |

FOREIGN PATENT DOCUMENTS

| | | | |
|---|---|---|---|
| 2020013 | 11/1971 | Germany | 434/358 |

OTHER PUBLICATIONS

"Bar Code Method for Automatic Catalog Orders," IBM Technical Disclosure Bulletin vol. 31, No. 4, Sep. 1968, pp. 243–244 (No author).

Primary Examiner—Donald Hajec
Assistant Examiner—Jeffrey R. Filipek

[57] ABSTRACT

A method of entering a hand-marked response into a system by altering a predetermined modified bar code symbol in a manner so that the bar code is rendered readable. In this manner, bar code reading devices can be utilized to detect the hand marked response. In an alternative embodiment, one of several potential responses may be marked and rendered non-decodable. A bar code reading device determines which of the several responses has been hand-marked by ascertaining which is non-decodable. Marking the response sheets may be aided by using an opaque template sheet or using a pressure sensitive overlay sheet.

36 Claims, 9 Drawing Sheets

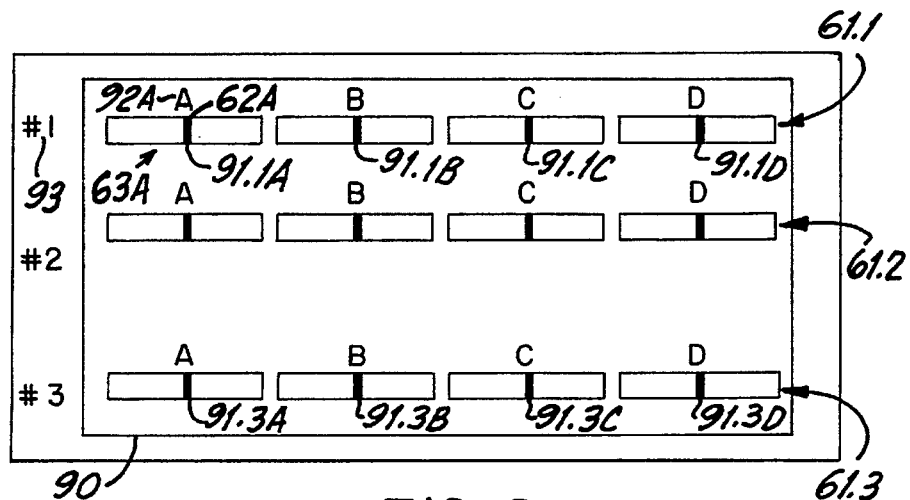
FIG. 8
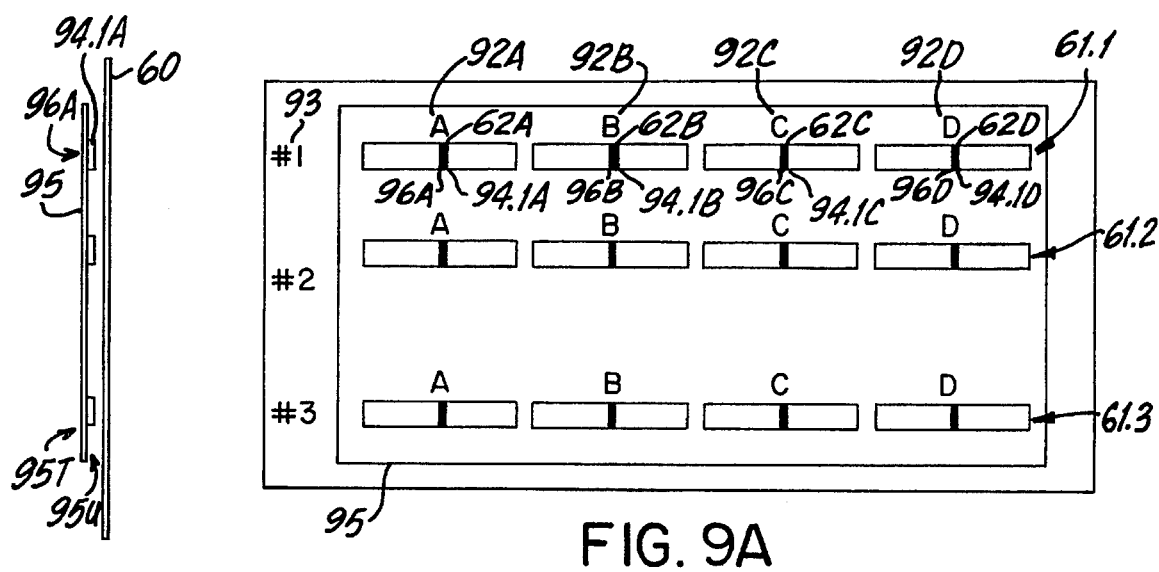
FIG. 9B
FIG. 9A

MACHINE READABLE CODE COMBINING PREPRINTED INDICIA WITH HAND-MARK DATA

This is a continuation of U.S. patent application Ser. No. 07/913,092 now U.S. Pat. No. 5,331,137 filed Jul. 14, 1992.

FIELD OF THE INVENTION

This invention relates to reading systems for reading bar codes and hand-mark information and particularly, to a system and method for combining preprinting indicia with user-generated hand-mark information to form a machine readable document which can be read by a bar code reading system.

BACKGROUND OF THE INVENTION

Bar code reading systems for reading preprinted bar codes are well known and are used in many diverse applications, such as, for example, shipping, manufacturing, and retail checkout applications. The bar code reading systems are generally arranged to read one or more of the industry standard bar code formats, such as, for example, Code 39, Interleaved 2 of 5, Discrete 2 of 5, Code 128, Code 93, Codabar, UPC, etc. A bar code reading system reads and decodes the bar codes and forms a digital representation of the data which can then be displayed and/or provided to a host computer for subsequent processing.

The industry standard bar codes are generally encoded and pre-printed on an item (i.e., pre-printed bar code on a grocery item) or are encoded and machine printed on an adhesive label using a printer. Symbol Technologies Inc. portable printer Model No. PS1000 is illustrative of a printer for encoding and printing industry standard bar code labels.

Hand-mark sense system are also known which read hand-mark sense information from a document. A common example of a document using hand-mark sense information is a multiple choice examination, where the user darkens predetermined areas on the document corresponding to the desired answer to a question. A hand-mark sense reader then detects the various darkened areas on the document, and based on the relative position of the darkened areas on the document, information describing the hand-mark sense information is formed. To determine the relative position of the darkened areas on the document the hand-mark sense reader must accurately feed or position the document relative to the reader. Accordingly, variations in the size and shape of the document are limited. Finally, it is noted that a hand-mark sense reader is entirely different than a bar code reader, is not capable of reading bar codes, and generally costs more to produce than bar code readers.

There are many applications in which it is desired to combine both pre-printed bar code symbols with user enterable data (hand-mark sense information) on the same document. U.S. Pat. No. 4,877,948 describes a system for reading a document which contains both pre-printed bar codes and hand-mark sense information. In the U.S. Pat. No. 4,877,948, fixed information, which can not be modified by the user, is encoded and pre-printed as bar codes. The hand-mark sense information is entered by the user in an area on the document different from where the bar codes are printed. A reading device comprising in combination a bar code scanning device and a hand-mark sense reading device is arranged to read the bar code and the hand-mark sense information, respectively, and to form information descriptive thereof. However, as can be appreciated, the manufactured cost for the combination reader is inherently greater than the manufactured cost of just the bar code scanning device.

U.S. Pat. No. 4,728,784 discloses a method and system for reading hand modified bar codes. The reading device of the U.S. Pat. No. 4,728,784 is arranged to read a unique preprinted bar code having a portion thereof hand-modified by a user. The hand-modified bar code is then scanned using a bar code reader and decoded by a unique decoding algorithm which detects which portion of the unique pre-printed bar code has been hand-modified. Based upon the position of the hand-mark within the pre-printed bar code, a predetermined character is output by the reading device. However, it is noted that the encoding format of the data is entirely different than the industry standard formats. Accordingly, bar code readers that are arranged to decode bar codes encoded in the industry standard formats can not be used for decoding the bar codes described in the U.S. Pat. No. 4,728,784.

SUMMARY OF THE INVENTION

It is an object of the present invention to develop a method and system for reading a document having both pre-printed bar codes and hand-mark sense information printed thereon that overcomes the limitations of the prior art.

It is a further object of the present invention to develop a method and system for reading a document having both pre-printed bar code information and hand-mark sense information thereon using a bar code reader which is arranged to read and decode industry standard bar code formats.

According to one embodiment of the invention, a method of entering a hand-marked response into a system is provided using a plurality of encoded and pre-printed bar code sequences, where each bar code sequence corresponds to a unique predetermined character string and includes a plurality of spaces and a plurality of bars and a modified bar. The modified bar is arranged to render the bar code sequence non-decodable by a bar code decoding device when the modified bar is not hand-marked, where the modified bar is arranged to render the bar code sequence decodable by the bar code decoding device when the modified bar is hand-marked. The method comprises the step of hand-marking the modified bar of a selected one of the plurality of bar code sequences. The plurality of bar code sequences are read by a bar code reading means and a first signal representative of the plurality of bar code sequences is formed. The the first signal is processed by the bar code decoding device to decode the unique predetermined character string corresponding to the selected one of the plurality of bar code sequences which includes the hand-marked modified bar, and forming a second signal including the decoded unique predetermined character string of the selected one of the plurality of bar code sequences. The second signal is then output from the bar code decoding device to the system.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 8 shows a document to be read by the bar code reader of FIG. 1 in accordance with a further embodiment of the present invention;

FIGS. 9A–9B shows a document to be read by the bar code reader of FIG. 1 in accordance with a further embodiment of the present invention;

DETAILED DESCRIPTION OF A SPECIFIC EMBODIMENT

A number of specific embodiments of the invention are described herein. It will be understood that these embodiments are presented for the purpose of illustration and not as limiting the scope of the invention.

Figure 1:
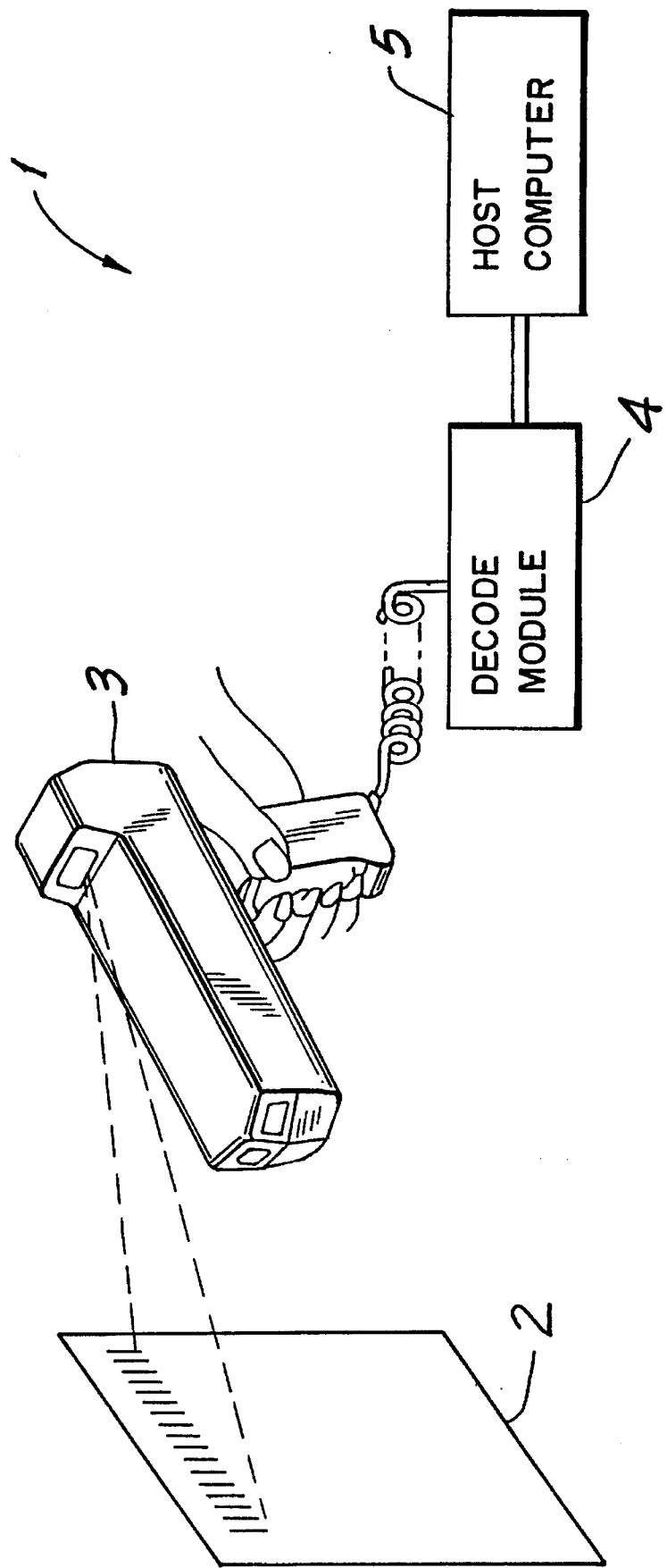
FIG. 1 illustrates a bar code reading system according to a preferred embodiment of the present invention.

Referring to FIG. 1, a bar code reading system 1 is shown for reading a document 2 which includes fixed, pre-printed bar code information as well as variable hand-mark information. The bar code reading system 1 includes a bar code reader 3 for scanning selected portions of the document. Various types of desk-top or portable, hand-held scanner systems are exemplified by U.S. Pat. Nos. 4,369,361; 4,387, 297; and 4,409,470—all of such patents being owned by the assignee of the instant invention and being incorporated by reference herein. The reader 3 outputs a digitized signal which is representative of the scanned portion of the document.

A decode module 4 receives the digitized signal generated in the reader 3, and determines whether the digitized signal represents a bar code conforming to one of many industry standard formats for which the decode module 4 is programmed to decode. Assuming that the digitized signal generated in the reader 3 does conform to one of the industry standard formats for which the decode module 4 is programmed to decode, the decode module 4 calculates the desired data, e.g., the multiple digit representation or code of the bar code symbol, in accordance with an algorithm contained in a software program. Symbol Technologies, Inc. Product No. LL500 is an illustrative example of the decode module 4 shown in FIG. 1.

Upon a successful decode of a bar code, the decode module 4 communicates to a host computer 5 the decoded data, e.g., the representation or code of the bar code symbol. The host computer 5 utilizes the decoded data in varied ways depending upon application software resident in the host computer.

Figure 2:
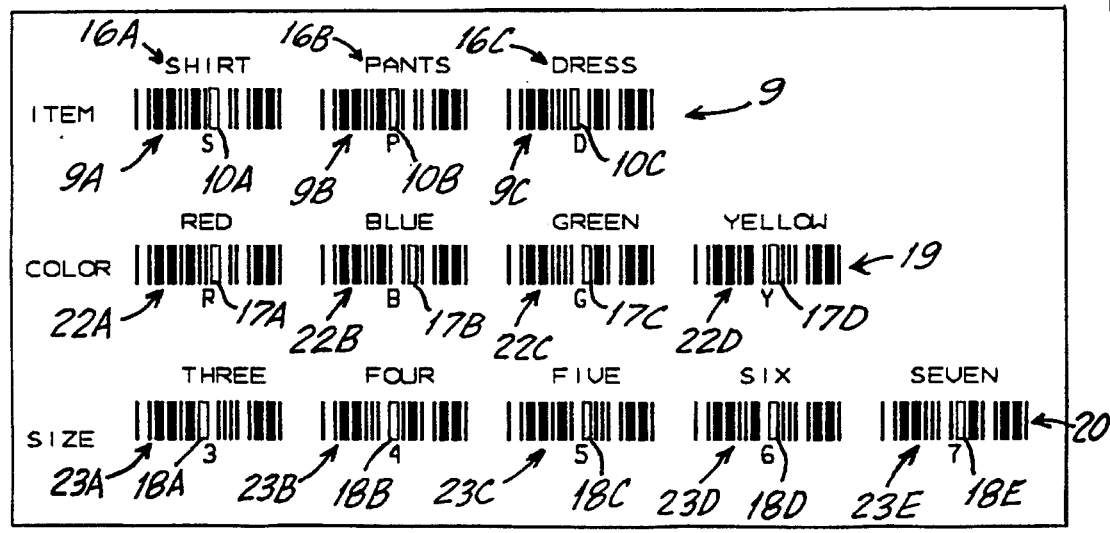
FIG. 2 shows in greater detail the document to be read by the bar code reading system of FIG. 1.

FIG. 2 illustrates the document 2 of FIG. 1 in greater detail. For illustrative purposes, bar codes conforming to the Code 39 standard are shown with the understanding that the present invention is not limited thereto. In this embodiment, the document 2 is shown as an order form for ordering from a mail order catalog service. The document 2 contains fixed, pre-printed bar code information describing the customer name 6 and address 7A–B. It is noted that in accordance with the Code 39 format, each line of the bar code begins and ends with a start/stop character "*". When the reader 3 scans the bar code 6 representing the customer's name, a digitized signal representative of the bar code 6 is output to the decoder module 4. The decoder module 4 decodes the digitized signal and outputs decoded data representing the characters positioned between the start/stop characters "*" to the host computer 5. For example, when bar code 6 is scanned, the decode module 4 generates the decoded data "JANE SMITH" which is then provided to the host computer 5. Similarly, when bar code 7A is scanned, the decode module 4 generates the decoded data "2 MAIN STREET" and when bar code 7B is scanned, the decode module 4 generates the decoded data "TOWN NY 12345".

A user ordering section 8 is provided in which the customer selects an ITEM for purchase, along with the desired COLOR and SIZE for the selected item. The ITEM selection segment 9 includes three pre-printed bar code sequences 9A–9C. The ITEM selection segment 9 is shown in greater detail in FIG. 3.

Figure 3:
FIG. 3 shows in greater detail the preprinted bar code sequences representing the ITEM selection segment of FIG. 2.

Referring to FIG. 3, the first preprinted bar code sequence 9A in the ITEM selection segment 9 includes wide and narrow bars and spaces arranged to form a character string. The first character 11 represented by the bar code sequence 9A is a start/stop character "*"; the second character 12 represented by the bar code sequence 9A is a "P"; and the third character 13 represented by the bar code sequence 9A is the start/stop character "*". All the bars (narrow and wide) in the bar code sequence 9A are printed as solid black, with the exception of one bar, which is herein referred to as the invisible bar 10A (also referred herein as the modified bar), which is printed in red ink. The invisible bar 10A is shown in FIGS. 2 and 3 for illustrative purposes as a hashed box. In the case where the reader 3 is a laser scanner which scans the symbols with a red laser light, the red printing of the invisible bar 10A reflects the red laser light, and therefore, the invisible bar 10A can not be distinguished from the white background, and therefore, is not detected by the reader 3. However, the red color of the invisible bar 10A can be seen by a human.

The remaining bar code sequences 9B and 9C are similar to bar code sequence 9A in that they each start and end with start/stop characters "*". In bar code sequences 9B–9C the middle characters 14 and 15 are "P" and "D", respectively. The middle characters 14 and 15 each includes an invisible bar 10B and 10C, respectively, which is not detected by the reader 3.

The item selection line 9, as initially pre-printed, is intentionally arrange to cause the decoding module 4 to fail to decode characters 12, 14 and 15. In more detail, the decoding module 4 is arranged to output decoded data to the host computer 5 only when the decode module 4 decodes a bar code sequence having proper start/stop characters and when each character between the start/stop characters are determined to be valid characters. However, since the characters 12, 14 and 15 contain invisible bars 10A, 10B and 10C, respectively, which are not detected by the reader 3, the digitized signal output by the reader 3 is not representative of valid characters. Accordingly, the decoding module 4 fails to detect a valid bar code sequence from the digitized signal output by the reader 3.

Color selection line 19 and size selection line 20 are similar to item selection line 9 in that each includes a number of bar code sequences, each sequence beginning and ending with start/stop characters. Each bar code sequence also includes a character having one invisible bar (e.g., color selection line 19 has invisible bars 17A–17D and size selection line 20 has invisible bars 18A–18E).

Referring to FIG. 2, to select an item for purchase, a user darkens (e.g., variable hand-mark information), with a number two pencil, a selected one of the invisible bars 10A, 10B or 10C. For example, if the user wants to select pants for purchase, the user darkens the invisible bar 10B which is positioned over the PANTS inscription 16B. To select the desired color for the pants, the user darkens a selected one of the invisible bars 17A–17D, each of which corresponds to particular color. Finally, to select a size for the pants, the user darkens one of the invisible bars 18A–18E, each of which corresponds to a particular size.

After the user completes the entry of the hand-mark information in the user ordering section 8 of the document 2, the document is in condition to be scanned. A bar code reader 3 scans the fixed, preprinted bar code 6 representing the customer's name and a digitized signal representative of the bar code 6 is output to the decoder module 4. The decoder module 4 decodes the digitized signal and outputs to the host computer 5 the customers name (e.g., "JANE SMITH"). Similarly, when the fixed, preprinted bar code 7A is scanned, the decode module 4 generates and outputs to the host computer 5 the decoded data "2 MAIN STREET", and when the fixed, preprinted bar code 7B is scanned, the decode module 4 generates the decoded data "TOWN, NY 12345". Which is provided to the host computer 5.

The reader 3 is also used to scan the hand-marked item selection line 9. In the above describe example, in the item selection line 9, only the PANTS segments 9B has its corresponding invisible bar 10B hand-marked. The invisible bars 10A and 10C are not hand-marked. It is noted that the hand-marked invisible bar 10B can be read by the reader 3 while the invisible bars 10A and 10C which are not hand-marked can not be read by the reader 3. Accordingly, the reader 3 will generate a digitized signal representative of the three bar segments 9A–9C, where the digitized signal excludes the invisible bars 10A and 10C which have not been hand-marked, but includes the invisible bar 10B which has been hand marked. As can be appreciated, only the bar code segment 9B which has the hand-marked invisible bar 10B represents a valid Code 39 character string, and therefore, the decode module 4 properly decodes only bar code segment 9B and outputs the decoded data character "P" to the host computer 5. The remaining two bar code segments 9A and 9C, which do not represent valid Code 39 character strings, are not properly decoded by the decode module 4, and therefore, the decode module does not output the decoded data of bar code segments 9A and 9C to the host computer 5.

In a similar fashion, the reader 3 scans the color selection line 19. Assuming, for example, that the invisible bar 17C corresponding to the color GREEN is hand-marked. The decoder module 4 properly decodes the bar code segment 22C which includes invisible bar 17C and outputs the decoded data character "G" to the host computer 5. Size selection line 20 is also scanned by the reader 3. Assuming, for example, that the invisible bar 18D corresponding to the size SIX is hand-marked. The decoder module 4 properly decodes the bar code segment 23D which includes invisible bar 18D and outputs the decoded data character "6" to the host computer 5.

The user must be instructed to form hand-marked indications that substantially correspond with the position of the invisible bar. However, it is noted that Code 39 is an extremely tolerant format, and reasonable deviations in the width of the hand-marked indications from the width of the invisible bar will not prevent proper decoding.

Readers 3 are generally arranged to read one single line of bar code at a time. For example, in the case where the reader 3 is a hand-held, trigger actuated, bar code reader, the operator of the reader 3 must manually aim the reader 3 at each of the selection lines 9, 19 and 20, and actuate the reader by pulling the trigger. However, it is possible that the operator could fail to properly scan one or more of the selection lines 9, 19 and 20.

Figure 4:
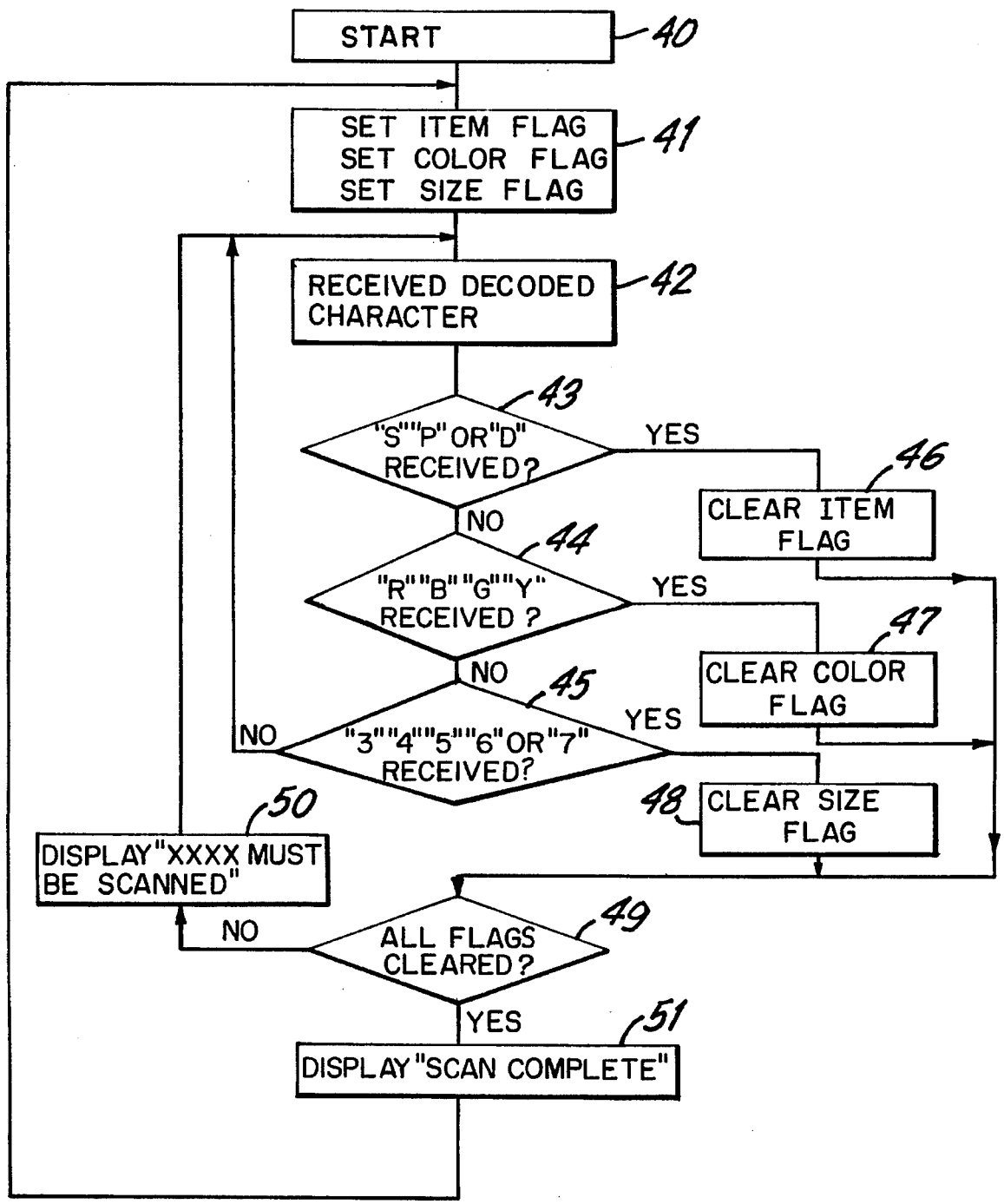
FIG. 4 is a flow-chart illustrating the operation of the host computer of FIG. 1.

Referring to the flow-chart of FIG. 4, the host computer 5 is arranged to verify that each of the selection lines 9, 19 and 20 is scanned and to appropriately prompt an operator of the reader 3. It is first noted that the character represented by each bar code segment 10A–10C, 22A–22D and 23A–23E is unique (e.g., no two characters are the same). The flow-chart starts at Step 40. At Step 41, an ITEM flag register, a COLOR flag register, and a SIZE flag register are set. At Step 42, the host computer 5 receives from the decoding module 4 the decoded character which has been scanned. At Steps 43, a check is made to determine whether the decode character received in Step 42 is one of the characters from the item selection line 9 (e.g., "S", "P" or "D") and if yes, the ITEM flag is cleared in Step 46. Steps 44 and 45 check to determine whether the character received in Step 42 is a character from item selection line 19 and 20, respectively, and if yes, the appropriate flag is cleared in Step 47 or 48. At Step 49, a check is made to determine whether all the flags set in Step 41 are cleared, and if yes, it is determined that each of the selection lines 9, 19 and 20 have been scanned and at Step 51 the host computer 5 displays on a display (not shown) information advising the operator that all selection lines have been scanned. If at Step 49, it is determined that some of the flags set in Step 41 remain set, at Step 50 the host computer 5 displays on the display (not shown) information describing which of the selection lines have not yet been read.

In FIG. 2, the user ordering section 8 contained a total of only twelve different bar code segments 9A–9C, 22A–22D and 23A–23E, and therefore, it was possible provide a single unique character for each bar code segment. However, if greater amounts of data are required to be entered by a user, each bar code segment can contain a number of characters, where the sequence of the characters is unique for each bar code segment.

Figure 5:
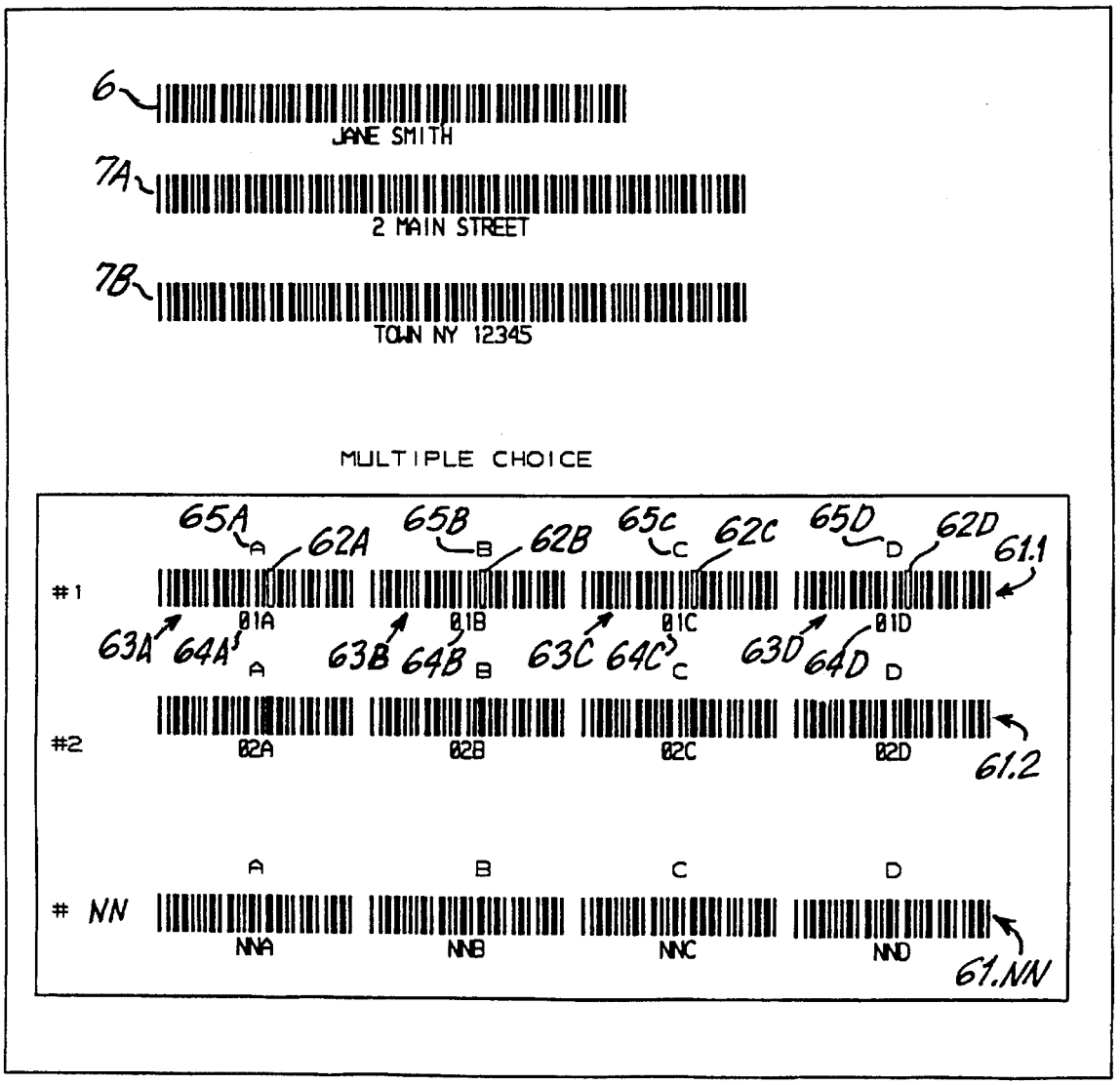
FIG. 5 shows a document to be read by the bar code reader in a further embodiment of the present invention.

Referring to FIG. 5, a document 60 for a multiple choice examination is shown. Bar codes 6, 7A and 7B, which are fixed, pre-printed codes that can not be modified by the user, are the same as those describe with reference to FIG. 2, and therefore, will not be further described herein.

Answer rows 61.1–61.NN are printed on the document 60 where the first answer row is represented as 61.1 and the last answer row is represented as 61.NN. Referring for illustrative purposes to answer row 61.1, answer row 61.1 includes pre-printed bar code segments 63A–63D, where each bar code segment is a string of encoded bar code characters, starting and ending with the start/stop character "*". The alpha-numeric description of the sequence of characters for each of bar code segments 63A–63D is shown for illustrative purposes as 64A–64D, respectively. The character string for each of the bar code segments 63A–63D is "* nn y *" (where nn=question number 01–NN; y=answer A–D). For example, the character strings for bar code segments 63A–63D are "*01A*", "*01B*", "*01C*" and "*01D*" respectively. The character strings for the bar code segments of the 15th answer row (not shown) are "*15A*", "*15B*", "*15C*" and "*15D*.

Each of the bar code segments 63A–63D include an invisible bar 62A–62D (e.g., printed in red ink). An answer description 65A–65D is printed under each of the invisible bars 62A–62D. The user is instructed, for each answer row 61.1–61.NN, to hand-mark the invisible bar associated with the desired answer description 65A–65D. After the document 60 is completed, each answer row 61.1–61.NN is individually scanned by reader 3, and for each answer row, only the bar code segment 63A–63D having its invisible bar 62A–62D hand-marked is decoded and the corresponding decoded character string 64A–64D is output to the host computer 5. Since each character string identifies which answer row 61.1–61.NN it is associated with, it is not required to sequentially scan the answer rows. Further, since the character string for each of the bar code segments is unique, the flow-chart of FIG. 4 can be easily modified to verify that each of the answer rows 61.1–61.NN has been scanned.

Figure 6:
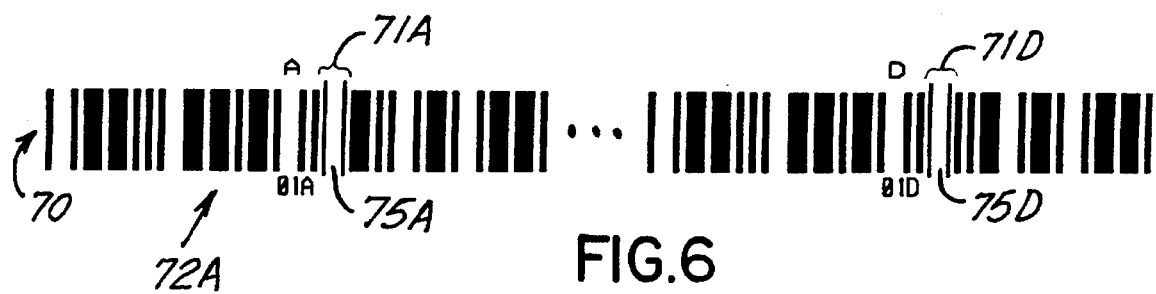
FIG. 6 shows in greater detail the preprinted bar code sequences representing the MULTIPLE CHOICE #1 selection segment of FIG. 5.

FIG. 6 shows an embodiment in which each invisible bar described with reference to FIG. 5 is replaced with sets of parallel marks 71A–71D. FIG. 6 shows a single answer row 70 which could be used to replace answer row one 61.1 of FIG. 5. The first preprinted bar code sequence 72A in the answer row 70 includes wide and narrow bars and spaces arranged to form the character string "*01A*". All the bars (narrow and wide) in the bar code sequence 72A are printed as a grey color, with the exception of one wide bar in the bar code sequence 72A, which is printed as a set of dark black parallel marks 71A. The bars of the code are printed in a grey color so as to direct the user's attention to the parallel marks surrounding the white spaces 75S–75D. For example, the bar code sequence 72A represents the character string "*01A*" and the last wide bar in the "A" character is selected to be the single wide bar in the bar code sequence 72A which is printed as a set of dark parallel marks 71A.

Figure 7A:
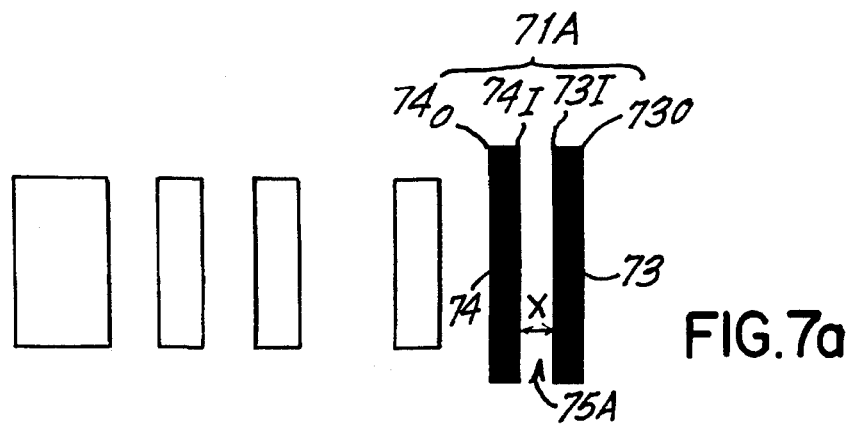
FIG. 7A shows in greater detail a bar code character of the bar code sequence of FIG. 6 in accordance with an embodiment of the present invention.
Figure 7B:
FIG. 7B shows in greater detail the character of FIG. 7A in standard Code 39 format.

FIG. 7A shows in greater detail the character "A" portion of the bar code sequence 72A. FIG. 7B illustrates, for reference purposes, the character "A" printed in standard Code 39 format. It is to be noted that the first four bars (starting from the left side of the drawings) of FIG. 8A and FIG. 8B are identical. The parallel marks 71A include bars 72 and 73, having inner edges 74I and 73I, and having outer edges 740 and 740, respectively. It is noted that the position of the outer edges 740 and 730 correspond with the position of the outer edges of the fifth bar shown in FIG. 7B. The inner edges 74I and 73I are separated by a white space 75A having a predetermined width X. The width X of the white space is intentionally selected to be large enough to prevent the decoder 4 from successfully decoding the bar code sequence 72A.

When the reader 3 scans the pre-printed answer line 70, prior to hand-marking, a digitized signal representative of the answer line 70 is formed. The digitized signal includes an indication of the white space 74A–74D between each set of parallel marks 71A–71D, respectively. The decoder 4 receives the digitized signal and fails to decode any of the bar code segments 72A–72D as proper code 39 character strings due to the presence of the white spaces 74A–74D. The user hand-marks the answer line 70 by filling in a selected one of the white spaces 75A–75D. For example, for the user to select multiple choice answer "A" the user hand-marks white space 75A corresponding to multiple choice answer "A". However, it is known that it is difficult for a user to maintain a hand-mark within a given boundary, such as the white space 75A. However, the bars 73 and 74 surrounding the white spaces act as guard bands which the user's hand-mark can inadvertently extend into without a negative effect on the decoding of the answer line 70. After a selected one of the white spaces 75A–75D is hand-marked, the answer line 70 can be scanned by reader 3 and the decoding module will output the character string corresponding to the bar code segment 72A–72D which includes the hand-marked white space 75A–75D, in a manner similar to that described above with reference to FIG. 5.

Alternatives to the red invisible bars and the parallel marks above described are envisioned in accordance with the present invention. For example, the invisible bars could be replaced with a very lightly shaded bar which cannot be distinguished from the white spaced by the reader 3. Further, any marking which is visible to the human, but cannot be distinguished from the white spaces by the reader 3 can be used in place of the red invisible bars. The parallel marks could be replaced by three or more bars, provided that the decoder 4 fails to properly decode the character that includes the parallel marks. In fact, the parallel marks can be replaced by any pattern that causes the decoder 4 to fail to properly decode the character that includes the respective pattern. Still further, the invisible bars can replace one of the bars in the start/stop character as opposed to replacing a bar in the character string.

FIG. 8 illustrates a further embodiment of the present invention. In some applications, the hand-mark section (e.g., answer lines 61.1–61.NN) of the document 60 shown in FIG. 5 appears to a user as excessively complex due to the visibility of the bars and strips. FIG. 8 shows an opaque template sheet 90, which is removably placed over the answer lines 61.1–61.4 of the document shown in FIG. 5. The template sheet 90 has cutout windows 91.1A–91.1D which are substantially the same size and shape as the invisible bars 62A–62D shown in FIG. 5, and are aligned substantially over the invisible bars 62A–62D. Printed on the template sheet 90, are an indication of the question number 93 and an indication identifying the possible multiple choice answers 92A–92D. Similar cutout windows and printing on the template sheet correspond to the answer rows 61.2–61.NN.

As can be appreciated, the template sheet 90 includes only the printing that is required to be visible to the user. The underlying bars and spaces are not visible to the user, thereby simplifying the appearance of the document.

To select an answer in answer row one 61.1, the user hand-marks a selected one of the invisible bars 62A–62D, which is positioned under cutout windows 91.1A–91.1D, respectively. There is no requirement that the hand-marked indication be confined to the inside of the respective cutout window, since any markings made outside of the selected cutout window will be drawn on the template sheet 90, and will not be marked on the document. The remaining answer rows 61.2–61.NN are hand-marked in a similar manner.

The template sheet 90 can be, for example, removably attached to the document by a weak adhesive that permits the template sheet 90 to be removed without tearing or defacing the underlying document 60. To read the document, an operator removes the template sheet 90 and utilizes the reader 3, decoder 4 and host computer 5 of FIG. 1 in a manner similar to that described with reference to FIG. 5, to determine which answers have been hand-marked by the user.

FIGS. 9A and 9B show front and side views of a further embodiment of the present invention in which the template sheet 90 of FIG. 8 is replaced with overlay sheet 95. Overlay sheet 95 is a opaque removable sheet having no cutout windows. On the underside of the overlay sheet 95, at each position which corresponds to the invisible bars 62A–62D of answer row one 61.1, there are located transfer indications 94.1A–94.1D, each of which can be transferred from the overlay sheet 95 to the document 60 when sufficient pressure is applied to the top side 95T of overlay sheet 95. Each of the transfer indications 94.1A–94.1D have a shape substantially similar to the invisible bars and each is positioned directly over a corresponding invisible bar. On the top side 95T of the overlay sheet 95 there is printed an indication of the question number 93, an indication identifying the possible multiple choice answers 92A–92D for each question, and location boxes 96A–96D corresponding to the position of the transfer indications 94.1A–94.1D.

To select an answer in answer row one 61.1, the user hand-marks a selected one of the location boxes 96A–96D with a writing instrument, such as a pen or pencil. The pressure from the pen or pencil causes the corresponding transfer indication 94.1A–94.1D to be transferred onto the corresponding invisible bar location on the document. The user is not required to remain strictly within the bounds of the selected location box, since there is no transfer indication outside of the position of the location boxes. Accordingly, hand-marks made on the top side 95T of the overlay sheet which are outside of the location boxes 96A–96D are not reflected on the actual document. In this way, very messy hand-marks can be tolerated.

After all the questions are answered, the overlay sheet 95 can be removed and the reader 3, decoding module 4 and the host computer 5 used in a manner similar to that described with reference to FIG. 6 to determine which answers have been selected.

The transfer indications 94.1A–94.1D can be, for example, carbon type ink, similar to that used in standard carbon paper, which is preprinted on the underside 95U of the overlay sheet 95. The pressure generated by the hand-marking on the top side 95T of the overlay sheet cause a portion of the carbon ink to be transferred to the document. Alternatively the transfer indications can be a type of stencil that is transferred from the overlay sheet 95 to the document when a corresponding area on the top side 95T of then overlay sheet 95 is hand-marked.

Figure 10:
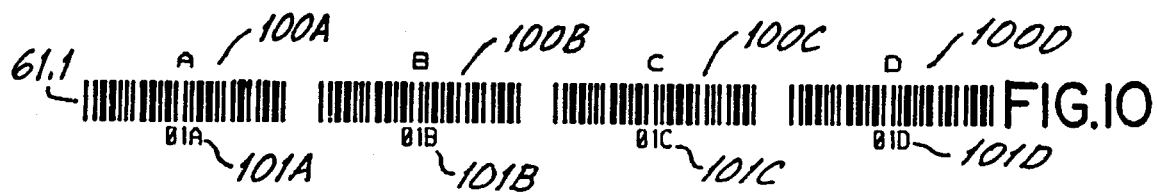
FIGS. 10–11 illustrate a bar code sequence to be read by the bar code reader of FIG. 1 in accordance with a still further embodiment of the present invention.
Figure 11:
Figure 12:
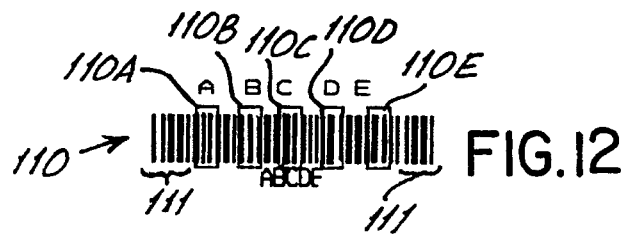
FIGS. 12–13 illustrate a bar code sequence to be read by the bar code reader of FIG. 1 in accordance with a yet another embodiment of the present invention.

FIGS. 10 and 11 illustrate a further embodiment of the present invention. Referring to FIG. 10, answer row one 61.1, which includes bar code segments 100A–100D is preprinted. In this embodiment each bar code segment, as preprinted, can be read and decoded without requiring hand-marking. Referring to bar code segment 100A, it begins and ends with a bar code representing the start/stop character "*". The characters between the start/stop character identify the question number (e.g., "01") and identify the answer (e.g., "A"). Below each bar code segment 100A–100D is printed an indication of the possible multiple choice selections 101A–101D.

Referring to FIG. 11, the user selects the multiple choice answer by placing a hand-marked indication 105 over a portion of the bar code segment 100A–100D which corresponds to the desired multiple choice selection. In this way, the bar code segment corresponding to the desired multiple choice selection is rendered non-decodable. The hand-marked 105 indication does not have to be well formed and does not have to be of a predetermined shape. Provided that the hand-mark indication completely covers at least one of the spaces in the bar code segment, the segment will be rendered unreadable.

The reader 3, the decoding-module 4 and the host computer 5 shown in FIG. 1 can be used to determine which of the multiple choice selections shown in FIG. 11 have been hand-marked. At the outset, it is noted that most decoding modules 4 arranged for reading standard formats, such as Code 39, will only output the characters associated with the first valid bar code segment 100A–100D encountered. However, many of the known decoding modules are software based, and the software in the decoder can be modified to cause the reader to output all the valid bar code segments 100A–100D encountered in an answer row 61.1.

The reader 3 scans the answer row 61.1 and provides a digitized signal representing the answer row to the modified decoding module 4. The decoding module decodes the digitized signal and outputs the characters of each valid bar code segments encountered to the host computer 5. For example, if the user hand-marked 105 the bar code segment 100A corresponding to multiple choice selection "A", the decoding module 4 will not be able to decode bar code segment 100A but will decode bar code segments 100B–100D. Accordingly, the decoding module 4 will output character strings "01B", "01C" and "01D" to the host computer 5 The host computer 5 can be programmed to store the character string that represents each of the bar code segments 100A–100D of each answer row (e.g., possible character strings for answer row one are "01A", "01B", "01C" and "01D") Accordingly, upon receiving the character strings from the decoding module 4, the host computer 5, by process of elimination, determines which of the bar code segments has been hand-marked.

Figure 13:
Figure 14:
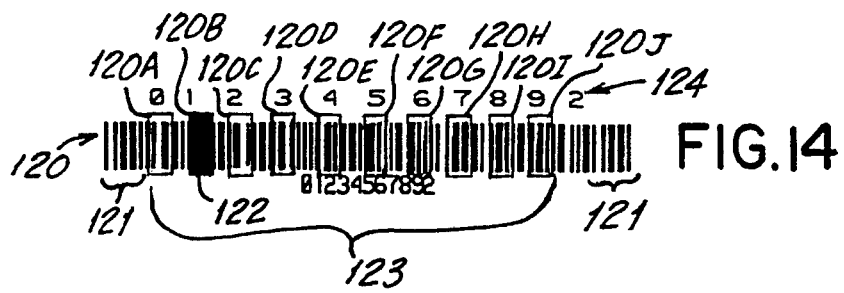
FIG. 14 illustrates a bar code sequence to be read by the bar code reader of FIG. 1 in accordance with a yet another embodiment of the present invention.

FIGS. 13 and 14 illustrate a further embodiment of the present invention. In this embodiment, answer row 110 is a pre-printed bar code having a string of encoded characters positioned between one set of encoded start/stop characters "*" 111. In the example shown, the characters "ABCDE" are positioned between the start/stop characters 111. Printed in red-ink over a portion of each character is a location box 110A–110E. Answer row 110 can be read and decoded using a standard Code 39 reader 3 and decoding module 4 provided that none of the location boxes are hand-marked.

Referring to FIG. 13, the user selects a desired multiple choice answer by placing a hand-marked 112 indication over a portion of a selected one of the location boxes 110A–110E, each of which corresponds to a different multiple choice answer. In this way, the bar code character corresponding to the desired multiple choice selection is rendered non-decodable.

The reader 3, the decoding module 4 and the host computer 5 shown in FIG. 1 can be used to determine which of the multiple choice selections have been hand-marked. At the outset, it is noted that most decoding modules 4 arranged for reading standard formats, such as Code 39, will not output any of the characters within a bar code segment if one or more of the characters within the bar code segment is not decodable. However, many of the known decoding modules are software based, and the software in the decoder can be modified to cause the reader to output all the valid characters encountered in an answer row 110, even if one or more of the characters encountered are invalid.

The reader 3 scans the answer row 110 and provides a digitized signal representing the answer row to the modified decoding module 4. The decoding module decodes the digitized signal and outputs the valid characters of answer row 110 to the host computer 5. For example, if the user hand-marked 112 the location box 110A corresponding to multiple choice selection "A", the decoding module 4 will not be able to decode the "A" character but will decode the "B", "C", "D" and "E" character, and will output the "B", "C", "D" and "E" characters to the host computer 5. The host computer 5 can be programmed to store data representing all the characters of each answer row (e.g., possible characters for answer row one is "A", "B", "C", "D" and "E") Accordingly, upon receiving the character strings from the decoding module 4, the host computer 5, by process of elimination, determines which of the bar code characters has been hand-marked.

FIG. 14 illustrates a further embodiment of the present invention. In this embodiment, answer row 120 is a pre-printed bar code having a string of encoded characters positioned between one set of encoded start/stop characters "*"121. In the example shown, the characters "01234567892" are positioned between the start/stop characters 121. The first ten characters (e.g., "0123456789") represent different possible multiple choice selections 123 and the eleventh character represents a checksum character 124 calculated in accordance with the Code 39 standard (e.g., sum of numerical values which are assigned to each of the characters in the multiple choice selection 123 is taken, modulo 43. For example, assuming the numerical values assigned to each character shown in FIG. 14 is as follows 0=0, 1=1, 2=2, 3=3, 4=4, 5=5, 6=6, 7=7, 8=8, 9=9: 0+1+2+ 3+4+5+6+7+8+9=45; Checksum character=45 Mod 43=2). Printed in red-ink over a portion of each of the first ten characters is a location box 120A–120J. Answer row 120 can be read and decoded using a standard Code 39 reader 3 and decoding module 4 provided that none of the location boxes 120A–120J are hand-marked.

The user selects a desired multiple choice selection by placing a hand-marked indication 122 over a portion of a selected one of the location boxes 120A–120J, each of which corresponds to a different multiple choice selection 123. In this way, the bar code character corresponding to the desired multiple choice selection is rendered non-decodable. For example, FIG. 14 shows that location box 120B, which corresponds to multiple choice selection "1" is hand-marked, and therefore the "1" is rendered non-decodable.

The reader 3 and the decoding module 4 shown in FIG. 1 can be used to determine the character that corresponds to the multiple choice selection 123 hand-marked 122. At the outset, it is noted that most decoding modules 4 which are arranged for reading standard formats, such as Code 39 with checksum digit, will not output any of the characters within a bar code segment if the checksum calculated for the multiple choice selections do not match the checksum digit, as is the case where one of the multiple choice selections is hand-marked. However, many of the known decoding modules are software based. The software in the decoder module 4 can be modified so that it decodes all the characters of the answer row 120, including the checksum digit 124, with the exception of the one character which is hand-marked 122. The decoder 4 then performs the operation shown in the flow-chart of FIG. 15, and outputs to the computer 5 the identity of the one character which is hand-marked.

Figure 15:
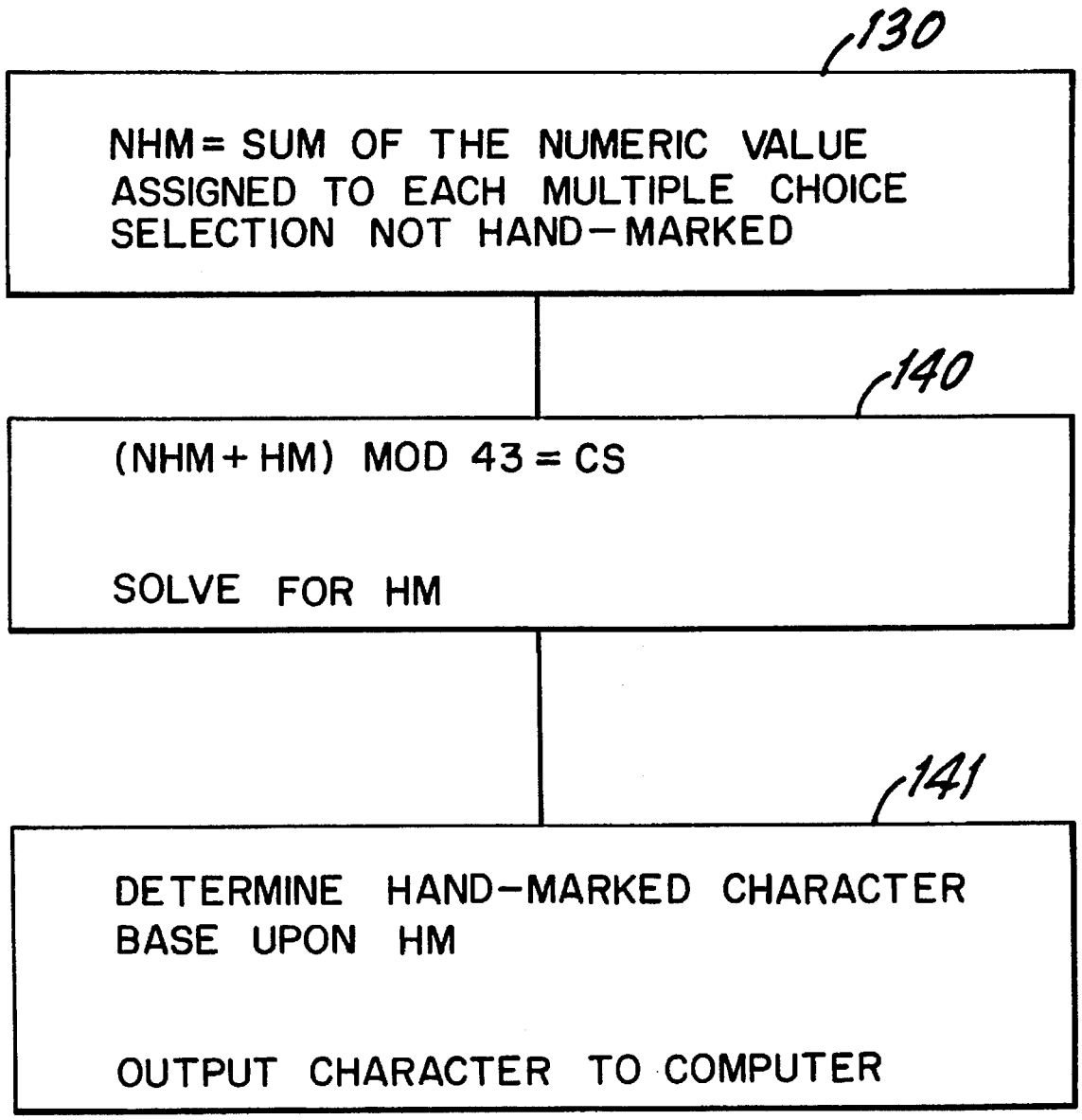
FIGS. 15–16 are flowcharts illustrating the operation of the decode module of FIG. 1 when decoding the bar code sequence of FIG. 14.

Referring to the flow-chart of FIG. 15, at Step 130, each of multiple choice selections 123 is decoded by the decoding module 4, with the exception of the one multiple choice selection which is hand-marked 122, and the numerical value assigned to each of the multiple choice selections 123 decoded are summed and the result stored as variable NHM. The checksum digit 124 is also decoded and the numerical value assigned to the checksum character is stored as variable CS.

At Step 140, the decoding module 4 determines the numerical value of the character which is rendered unreadable by the hand-marking. In more detail, it is known that (NHM+HM) Mod 43=CS, where HM equals the numeric value associated with the hand-marked character. At Step 140 the decoding module 4 solves for HM.

Figure 16:
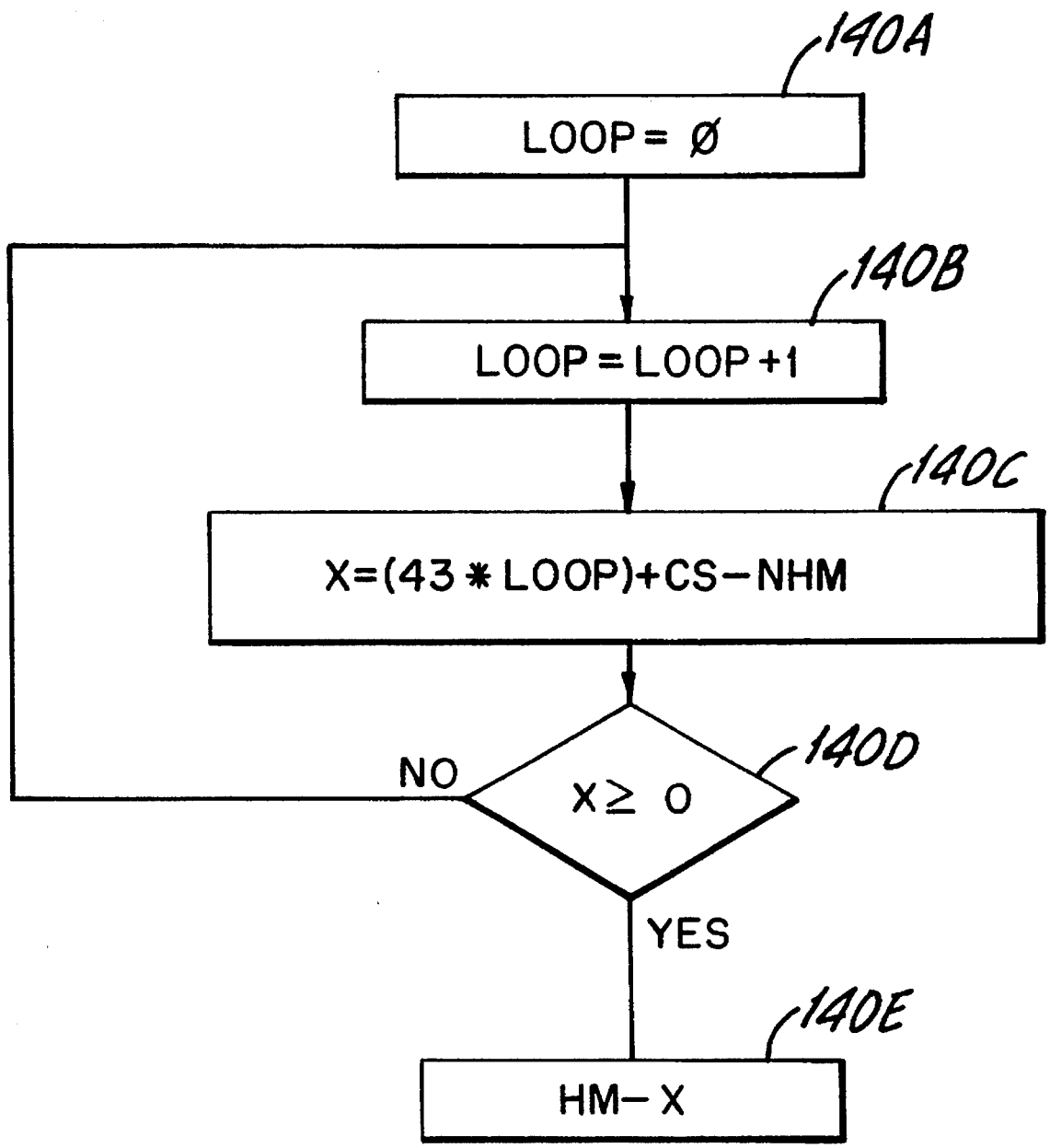

Steps 140A–140E of FIG. 16 illustrates a method by which the decoding module 4 solves at Step 140 for HM. At Step 140A a loop counter (LOOP) is set equal to zero. At Step 140B, LOOP is incremented by one. At Step 140C, the decoder 4 calculates ((43*LOOP)+CD−NHM) and stores the result as X. At Step 140D, if X is greater than or equal to zero, progress is made to Step 140E where HM is set to equal X and the program returns to Step 140 in FIG. 16. If at Step 140D, X is not greater than or equal to zero, progress is made to Step 14013 where loop 140B–140D is repeated until X is found to be greater or equal to zero at Step 140D.

At Step 141 shown in FIG. 15, the decoder module 4 determines the identity of the hand-marked character based upon the numerical value of HM determined in Step 140, and outputs the identity of the hand-marked character to the host computer 5.

For the specific example shown in FIG. 14, the sum of the multiple choice selections "0123456789" 123 is "45" and therefore the checksum digit equals (45 Mod 43)="2". The multiple choice selection "1" is hand-marked 122. Accordingly, referring to FIG. 16, at Step 130 NHM=0+2+3+4+5+ 6+7+8+9=44. In FIG. 16, at Step 140B LOOP=1, and at Step 140C X=(43*1)+2−44=1. At Step 140D, "1" is determined to be greater than zero and at Step 140E HM is set equal to "1". At Step 141 in FIG. 16, a HM value of "1" is determined to correspond to the character "1", and therefore, the character "1" is output to the host computer 5.

As can be appreciated in the above embodiment, the host computer 5 receives information identifying the hand-marked character. It is not required that the decoding module 4 or the host computer 5 be pre-programmed to store all the possible multiple choice selections 123. Accordingly, the embodiment described with reference to FIGS. 14–16 is extremely flexible and can be applied in a variety of applications.

While the above aspects of the present invention have been illustrated and described using bar codes conforming to the Code 39 standard, and using laser bar code readers, it is not intended that the present invention be limited to the details and applications shown, since variations and modifications and structural changes can be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A method of entering into a system a response hand-marked by a user comprising the steps of:

a) providing a document for hand-marking by a user, said document having a plurality of encoded and pre-printed bar code sequences, wherein each bar code sequence corresponds to a unique predetermined character string and includes a plurality of spaces and a plurality of bars and a modified bar, wherein the modified bar is arranged to render the bar code sequence non-decodable by a bar code decoding device when the modified bar is not hand-marked, and wherein the modified bar is arranged to render the bar code sequence decodable by the bar code decoding device when the modified bar is hand-marked;

b) reading the plurality of bar code sequences with a bar code reading means after the modified bar of a selected one of the plurality of bar code sequences has been hand-marked by the user and forming a first signal representative of the plurality of bar code sequences;

c) processing the first signal with the bar code decoding device to decode said unique predetermined character string corresponding to the selected one of the plurality of bar code sequences which includes the hand-marked modified bar, and forming a second signal including the decoded unique predetermined character string of the selected one of the plurality of bar code sequences; and d) outputting the second signal from the bar code decoding device to the system.

2. The method of claim 1 wherein, on the document provided to the user, the bars of the plurality of bar code sequences are a first color and the modified bar of each of the plurality of bar code sequences is a second color, wherein the bar code reading means can distinguish the first color from the second color, and wherein the second color of the modified bar hand-marked by the user prior to the reading step has been changed to be indistinguishable from the first color of the bars.

3. The method of claim 2 wherein the first color is substantially black, the second color is substantially red, and the color of the spaces is substantially white.

4. The method of claim 1 wherein, on the document provided to the user, each modified bar includes a pattern which renders the bar code non-decodable, and wherein the modified bar hand-marked by the user prior to the reading step has been darkened to render the bar code decodable.

5. The method of claim 4 wherein the pattern is a plurality of guide bars separated by a predetermined space.

6. The method of claim 1 including the additional step of providing with said document a template means for guiding a hand-marking device over the selected modified bar, wherein said template means may be removably affixed on top of the plurality of bar code sequences and has a plurality of openings, each of the plurality of openings being aligned with the position of the modified bars.

7. The method of claim 6 wherein the modified bar is a space.

8. The method of claim 1 including the additional step of providing with said document an overlay means removably affixed on top of the plurality of bar code sequences and having a plurality of transfer indication means, each of said transfer indication means being aligned with the position of one of the modified bars, and wherein the modified bar of the selected one of the plurality of bar code sequences has been hand-marked by the user prior to the reading step by transferring from the overlay means to the modified bar at least a portion of the transfer indication means aligned therewith.

9. A method of entering into a system a response hand-marked by a user comprising the steps of:

a) providing a document for hand-marking by a user, said document having a plurality of encoded and pre-printed bar code sequences each corresponding to a unique predetermined character string, wherein each bar code sequence is decodable when it is not hand-marked and undecodable when it is hand-marked;

b) storing the unique predetermined character strings corresponding to each of the plurality of bar code sequences in a memory;

c) reading the plurality of bar code sequences with a bar code reading means after at least one of the plurality of bar code sequences has been hand-marked by the user and forming a first signal representative of the plurality of bar code sequences;

d) processing the first signal with a bar code decoding device to decode each of said unique predetermined character strings corresponding to the plurality of bar code sequences other than the hand-marked bar code sequences, and forming a second signal representing the decoded unique predetermined character strings which correspond to the plurality of bar code sequences other than the hand-marked bar code sequences; and e) comparing the unique predetermined character strings represented in the second signal against the contents of the memory, and based on the comparison, forming a third signal representing the unique predetermined characters which are contained in the memory but are not represented in the second signal.

10. The method of claim 9 wherein, on the document provided to the user, each of the plurality of bar code sequences includes a plurality of bars and a plurality of spaces, and wherein all of at least one of the plurality of spaces of the selected bar code sequences hand-marked by the user prior to the reading step has been darkened.

11. A method of entering into a system a response hand-marked by a user comprising the steps of:

a) providing a document for hand-marking by a user, said document having a plurality of encoded and pre-printed characters in a bar code sequence, wherein each encoded character of the bar code sequence is decodable when it is not hand-marked and undecodable when it is hand-marked;

b) storing each of the plurality of characters of the bar code sequence in a memory;

c) reading the bar code sequence with a bar code reading means after at least one of the plurality of encoded characters has been hand-marked by the user and forming a first signal representative of the bar code sequence;

d) processing the first signal with a bar code decoding device to decode each of said plurality of characters other than the at least one hand-marked character, and forming a second signal representing each of the decoded characters other than the hand-marked characters; and e) comparing the characters represented by the second signal against the contents of the memory, and based on the comparison, forming a third signal representing the characters which are contained in the memory but are not represented by the second signal.

12. A method of entering into a system a response hand-marked by a user comprising the steps of:

a) providing a document for hand-marking by a user, said document having a plurality of encoded and pre-printed data characters in a bar code sequence, one of which may be hand-marked, the bar code sequence further including a checksum character which is a function of the plurality of data characters, wherein the checksum character and each encoded data character of the bar code sequence are decodable when they are not hand-marked and wherein an encoded data character of the bar code sequence is undecodable when it is hand-marked;

b) reading the bar code sequence with a bar code reading means after at least one of the plurality of encoded data characters of the bar code sequence has been hand-marked by the user and forming a first signal representative of the bar code sequence;

c) processing the first signal with a bar code decoding device to decode the checksum character and to decode each of said plurality of data characters other than the hand-marked character, and forming a second signal representing the checksum character and the decoded characters which correspond to the plurality of data characters other than the hand-marked character; and d) processing the second signal to determine the value of the hand-marked character based upon the decoded checksum character and the decoded plurality of data characters other than the hand-marked character, and forming a third signal representing the hand-marked character.

13. A bar code data acquisition system for obtaining a response hand-marked by a user comprising:

a) a document for hand-marking by a user, said document having a plurality of encoded and pre-printed bar code sequences, wherein each bar code sequence corresponds to a unique predetermined character string and includes a plurality of spaces and a plurality of bars and a modified bar, wherein the modified bar is arranged to render the bar code sequence non-decodable by a bar code decoding device when the modified bar is not hand-marked, and wherein the modified bar is arranged to render the bar code sequence decodable by the bar code decoding device when the modified bar is hand-marked;

b) a bar code reading means for scanning the document after the modified bar of a selected one of the plurality of bar code sequences has been hand-marked by the user and for forming a first signal representative of the plurality of bar code sequences; and c) a bar code decoding device for processing the first signal from the bar code reading means and for decoding said unique predetermined character string corresponding to the selected one of the plurality of bar code sequences which includes the hand-marked modified bar, and for forming a second signal including the decoded unique predetermined character string of the selected one of the plurality of bar code sequences.

14. The bar code data acquisition system of claim 13 wherein, on the document, the bars of the plurality of bar code sequences are a first color and the modified bar of each of the plurality of bar code sequences is a second color, wherein the bar code reading means can distinguish the first color from the second color.

15. The bar code data acquisition system of claim 14 wherein the bar code reading means comprises a laser based scanning device.

16. The bar code data acquisition system of claim 15 wherein the first color is substantially black, the second color is substantially red, and the color of the spaces is substantially white.

17. The bar code data acquisition system of claim 13 wherein, on the document, each modified bar includes a pattern which renders the bar code non-decodable and which can be darkened by a user to render the bar code decodable.

18. The bar code data acquisition system of claim 17 wherein the pattern is a plurality of guide bars separated by a predetermined space.

19. The bar code data acquisition system of claim 13 further comprising a template means for guiding a hand-marking device over a selected modified bar, wherein said template means may be removably affixed on top of the plurality of bar code sequences on the document and has a plurality of openings, each of the plurality of openings being aligned with the position of the modified bars.

20. The bar code data acquisition system of claim 19 wherein the modified bar is a space.

21. The bar code data acquisition system of claim 13 further comprising an overlay means removably affixed on top of the plurality of bar code sequences of the document and having a plurality of transfer indication means, each of said transfer indication means being aligned with the position of one of the modified bars, and wherein the modified bar of a selected one of the plurality of bar code sequences may be hand-marked by the user by transferring from the overlay means to the modified bar at least a portion of the transfer indication means aligned therewith.

22. A bar code data acquisition system for obtaining a response hand-marked by a user comprising:

a) a document for hand-marking by a user, said document having a plurality of encoded and pre-printed bar code sequences each corresponding to a unique predetermined character string, wherein each bar code sequence is decodable by a bar code decoding device when it is not hand-marked and undecodable by a bar code decoding device when it is hand-marked;

b) memory means for storing the unique predetermined character strings corresponding to each of the plurality of bar code sequences;

c) a bar code reading means for scanning said document after at least one of the plurality of bar code sequences has been hand-marked by a user and for forming a first signal representative of the plurality of bar code sequences;

d) a bar code decoding device for processing the first signal from the bar code reading means and for decoding each of said unique predetermined character strings corresponding to the plurality of bar code sequences other than the hand-marked bar code sequences, and for forming a second signal representing the decoded unique predetermined character strings which correspond to the plurality of bar code sequences other than the hand-marked bar code sequences; and e) means for comparing the unique predetermined character strings represented in the second signal against the contents of the memory means, and based on the comparison, for forming a third signal representing the unique predetermined characters which are contained in the memory means but are not represented in the second signal.

23. The bar code data acquisition system of claim 22 wherein, on the document, each of the plurality of bar code sequences includes a plurality of bars and a plurality of spaces, and wherein all of at least one of the plurality of spaces of the selected bar code sequences hand-marked by the user has been darkened.

24. The bar code data acquisition system of claim 23 wherein the bar code reading means comprises a laser based scanning device.

25. A bar code data acquisition system for obtaining a response hand-marked by a user comprising:

a) a document for hand-marking by a user, said document having a plurality of encoded and pre-printed characters in a bar code sequence, wherein each encoded character of the bar code sequence is decodable by a bar code decoding device when it is not hand-marked and undecodable by a bar code decoding device when it is hand-marked;

b) memory means for storing each of the plurality of characters of the bar code sequence;

c) a bar code reading means for scanning the document after at least one of the plurality of encoded characters has been hand-marked by the user and for forming a first signal representative of the bar code sequence;

d) a bar code decoding device for processing the first signal from the bar code reading means and for decoding each of said plurality of characters other than the at least one hand-marked character, and for forming a second signal representing each of the decoded characters other than the hand-marked characters; and e) means for comparing the characters represented by the second signal against the contents of the memory means, and based on the comparison, for forming a third signal representing the characters which are contained in the memory means but are not represented by the second signal.

26. The bar code data acquisition system of claim 25 wherein the bar code reading means comprises a laser based scanning device.

27. A bar code data acquisition system for obtaining a response hand-marked by a user comprising:

a) a document for hand-marking by a user, said document having a plurality of encoded and pre-printed data characters in a bar code sequence, one of which may be hand-marked, the bar code sequence further including a checksum character which is a function of the plurality of data characters, wherein the checksum character and each encoded data character of the bar code sequence are decodable by a bar code decoding device when they are not hand-marked and wherein an encoded data character of the bar code sequence is undecodable by a bar code decoding device when it is hand-marked;

b) a bar code reading means for scanning the document after one of the plurality of encoded data characters of the bar code sequence has been hand-marked by the user and for forming a first signal representative of the bar code sequence;

c) a bar code decoding device for processing the first signal to decode the checksum character and to decode each of said plurality of data characters other than the hand-marked character, and for forming a second signal representing the checksum character and the decoded characters which correspond to the plurality of data characters other than the hand-marked character; and d) means for processing the second signal to determine the value of the hand-marked character based upon the decoded checksum character and the decoded plurality of data characters other than the hand-marked character, and for forming a third signal representing the hand-marked character.

28. The bar code data acquisition system of claim 27 wherein the bar code reading means comprises a laser based scanning device.

29. A document for hand-marking by a user so as to provide a machine readable response, said document having a plurality of encoded and pre-printed bar code sequences, wherein each bar code sequence corresponds to a unique predetermined character string and includes a plurality of spaces and a plurality of bars and a modified bar, wherein the modified bar is arranged to render the bar code sequence non-decodable by a bar code decoding device when the modified bar is not hand-marked, and wherein the modified bar is arranged to render the bar code sequence decodable by the bar code decoding device when the modified bar is hand-marked.

30. The document of claim 29 wherein the bars of the plurality of bar code sequences are a first color and the modified bar of each of the plurality of bar code sequences is a second color, the first color being distinguishable from the second color by a bar code reading means.

31. The document of claim 30 wherein the first color is substantially black, the second color is substantially red, and the color of the spaces is substantially white.

32. The document of claim 29 wherein each modified bar includes a pattern which renders the bar code non-decodable and which can be darkened by a user to render the bar code decodable.

33. The document of claim 32 wherein the pattern is a plurality of guide bars separated by a predetermined space.

34. The document of claim 29 further comprising a template means for guiding a hand-marking device over a selected modified bar, wherein said template means may be removably affixed on top of the plurality of bar code sequences on the document and has a plurality of openings, each of the plurality of openings being aligned with the position of the modified bars.

35. The document of claim 34 wherein the modified bar is a space.

36. The document of claim 29 further comprising an overlay means removably affixed on top of the plurality of bar code sequences of the document and having a plurality of transfer indication means, each of said transfer indication means being aligned with the position of one of the modified bars, and wherein the modified bar of a selected one of the plurality of bar code sequences may be hand-marked by the user by transferring from the overlay means to the modified bar at least a portion of the transfer indication means aligned therewith.

\* \* \* \* \*